United States Patent [19]

Goodwin et al.

[11] Patent Number: 4,654,846

[45] Date of Patent: Mar. 31, 1987

[54] SPACECRAFT AUTONOMOUS REDUNDANCY CONTROL

[75] Inventors: Paul G. Goodwin, Princeton; Michael B. Silverman, Lakehurst; George A. Beck, Princeton, all of N.J.

[73] Assignee: RCA Corporation, Princeton, N.J.

[21] Appl. No.: 563,609

[22] Filed: Dec. 20, 1983

[51] Int. Cl.[4] .............................................. G06F 11/20
[52] U.S. Cl. ...................................... 371/8; 364/187; 371/9
[58] Field of Search ............... 371/8, 9; 364/187, 200, 364/900; 244/194, 195

[56] References Cited

U.S. PATENT DOCUMENTS 3,875,390  4/1975  Eccles et al. .......................... 371/9
4,500,951  2/1985  Sugimoto et al. ................... 371/9 X
4,503,534  3/1985  Budde et al. ............................. 371/9

OTHER PUBLICATIONS

D. A. Rennels, Architectures for Fault-Tolerant Spacecraft Computers, Proceedings of the IEEE, vol. 66, No. 10, Oct. 1978, pp. 1255-1268.

F. G. Snyder, Modular Fault Tolerance Keeps Computer Systems Reliable, Electronic Design, vol. 29, No. 10, May 14, 1981, pp. 163-167.

*Primary Examiner*—Charles E. Atkinson
*Attorney, Agent, or Firm*—Joseph S. Tripoli; Robert L. Troike

[57] ABSTRACT

The spacecraft system has automatic fault detection and autonomous reconfiguration of redundant hardware and software to correct that fault without ground station intervention. The spacecraft has redundant processors, sensors, control systems and buses. When a unit is believed to have failed as detected by the satellite processor unit, it switches to a backup unit. If the symptom persists after the unit is switched, the processor unit switches to a different bus. If the fault still exists, a new processor unit is switched in and the entire checking and switching repeats.

7 Claims, 4 Drawing Figures

SPACECRAFT AUTONOMOUS REDUNDANCY CONTROL

The Government has rights in this invention pursuant to Contract No. F04701-75-C-0182 awarded by the Department of the Air Force.

The invention is directed to redundancy on a spacecraft and more particularly to autonomous redundant control of a spacecraft.

In a spacecraft such as the Defense Meterological Satellite Program (DMSP), the satellite is placed in a low earth orbit (for DMSP example, 101 minutes) and only a few minutes (5 to 15 for the example) of communication contact with ground stations is provided each orbit. The primary mission of this DMSP type of satellite is to provide visual and infrared global weather data during the short communication time to other selected areas around the globe. Because ground station contact time is limited it is desirable to have the ground stations spend as much time as possible on data retrieval and sensor management and as little time as possible on spacecraft bus management. It is highly desirable that some form of autonomous system on-board the spacecraft be utilized in order to keep the system in operation with the least support from the ground. Autonomous redundant control of the spacecraft is also useful to simplify the ground station operations. The need for highly skilled engineering crew members around the clock is overcome if more of this work can be handled by the satellite itself. It is also desirable for spacecraft survivability in a crisis environment, where ground contact control can be interrupted for long periods of time, that the spacecraft continues to provide operational support.

In the past, redundancy for individual controls or individual sensors has been provided. Upon the detection of an error in the data retrieved from a particular sensor, control would automatically switch to a redundant unit. There has been, however, a need for a fully autonomous redundancy system wherein the spacecraft could provide overall testing, evaluating, and switching to correct for errors and maintain the spacecraft in operational control.

In accordance with one aspect of the present invention, a method is described for providing on-board a spacecraft autonomous redundant control to perform automatic fault detection and automatically manage reconfiguration of the spacecraft system where that system includes primary and redundant sensors and controls, data processors and input/output circuits between the sensor and controls and the data processor. The method includes the steps of automatically testing said primary sensors and primary controls, automatically disconnecting said primary sensor or primary control from said input/output circuit and the connection of said redundant control upon detection at said processor of errors from a sensor or control exceeding a predetermined threshold, automatic testing of the switched redundant sensor and control, and then automatically disconnecting a first input/output circuit and connecting a second redundant input/output circuit between said sensor or control and the processor if after connecting said redundant sensor or control the errors tested continue to exceed the threshold.

Figure 1:
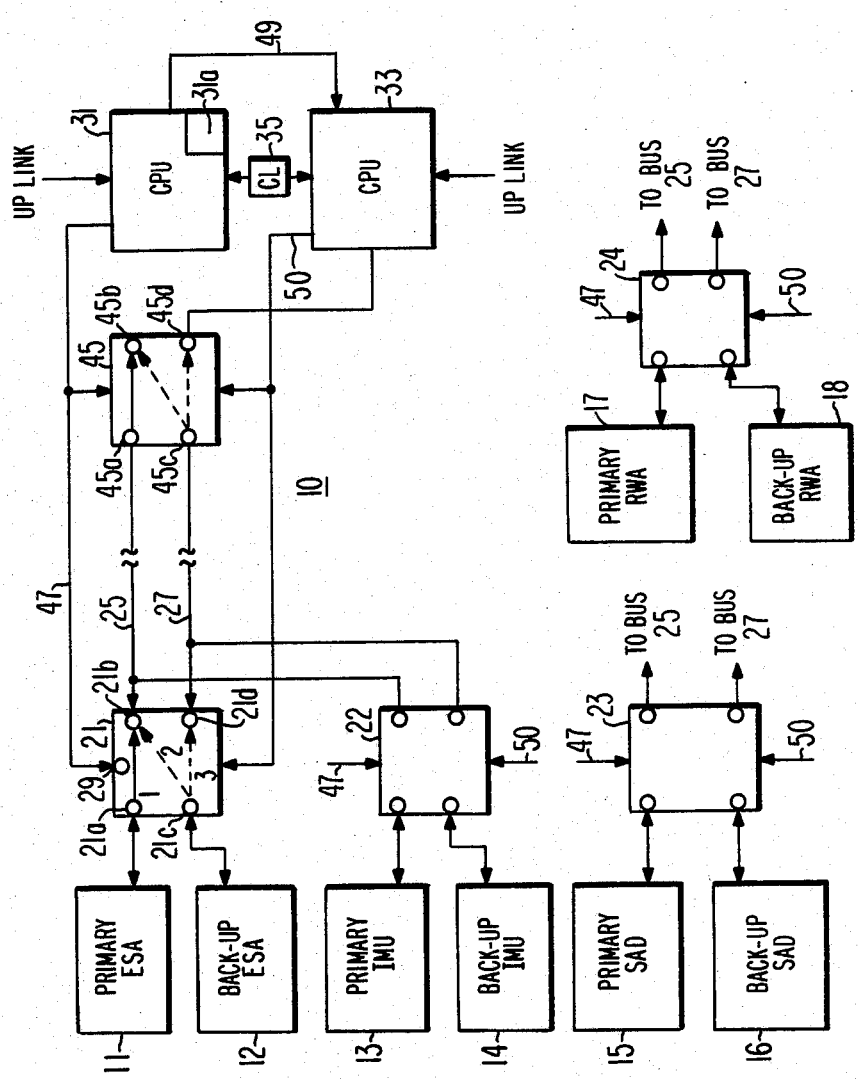
FIG. 1 is a functional block diagram of the autonomous redundant control system according to one embodiment of the present invention.

Referring to the overall spacecraft system 10 in FIG. 1, the system includes a primary earth sensor assembly (ESA) 11, a backup earth sensor assembly (ESA) 12, a primary inertial measurement unit (IMU) 13, a backup inertial measurement unit (IMU) 14, a primary solar array drive (SAD) 15, a backup solar array drive (SAD) 16, a primary reaction wheel assembly (RWA) 17 and a backup reaction wheel assembly (RWA) 18. These hardware units 11 through 18 are selectively provided on buses 25 and 27 via four way switches 21, 22, 23 and 24. The switches are shown as relays for explanation purposes only. These switches would be state-of-the-art electronic switches. Switch 21 in its initial state connects the primary ESA 11 at terminal 21a to bus 25 at terminal 21b as indicated by the solid arrow and label 1. In its second state the switch 21 will connect the backup ESA 12 at terminal 21c to bus 25 via terminal 21b and disconnect the primary ESA 11. This is indicated by the dashed arrow and label 2. In the third state the switch 21 will connect the backup ESA 12 at terminal 21c to the second bus 27 via terminal 21d. This third state is indicated by the dashed arrow and label 3.

Similarly, switch 22 controls the connections of the primary IMU 13 and the backup IMU 14 to the bus 25 and then to bus 27 in the third state. Likewise the primary SAD 15 and backup SAD 16 are coupled to bus 25 and then to bus 27 in the third state via switch 23 and the primary RWA 17 and backup RWA 18 are coupled by switch 24 to bus 25 and then to bus 27 in the third state. The control for the states of the switches is provided by one of two central processor units (CPU) 31 or 33.

The processor unit 31, for example, is designated as the primary processor while the processor unit 33 is designated as and operates as the redundant processor. The processor units 31 and 33 are typical microprocessors for example including memory, input/output controls, ROM program control, counters, address generators, etc. The two central processor units 31 and 33 are timed and synchronized together by common clock source 35. These processor units include RAM programs that provide test signals to the units 11 through 18. The processor unit receives interrupts and data from the units 11 through 18 and in response thereto processes the same to detect if errors exceed threshold levels for a period of time as detected by counters which count the errors. If the errors exceed the preset threshold levels the processor units provide appropriate switching signals to the switches 21 through 24 to provide the automated redundant control.

In the embodiment of FIG. 1 a switch 45 is positioned between the buses 25 and 27 and the processor units 31 and 33 for switching from the processor unit 31 to the redundant processor unit 33. The switch 45 between buses 25 and 27 and the processor units 31 and 33 is a four position switch under the control of processor units 31 or 33. Assuming that processor unit 31 is the primary processor, the initial state of switch 45 is to pass the signals on bus 25 at terminal 45a to the processor unit 31 via terminal 45b as indicated by the solid arrow and label 1. The second position of switch 45 couples the signals on bus 27 to the processor unit 31 by providing a connection between terminal 45c and terminal 45b as indicated by the dashed arrow and label 2. The third position of switch 45 couples the signals on bus 27 at terminal 45c to redundant processor unit 33 via terminal 45d.

In the operation of the system described above, processor unit 31 would first detect the errors appearing at the processor unit by responding to the interrupt signals and data sent by the primary units 11, 13, 15, or 17 via bus 25 and switches 21 and 45 in their first positions. The processor unit 31 would then compare the interrupt and data against a reference and count the errors. For the ESA and IMU the data is sensor data. For the SAD and RWA the data is both sensor and controller data. When a primary unit such as 11, 13, 15 or 17 is detected as having failed or exceeds its threshold of errors, the software in the program designates the backup unit for active use. The processor unit 31 sends a switch control signal over leads 47 to the appropriate ones of switches 21, 22, 23 or 24 to switch the output of the appropriate backup unit 12, 14, 16 or 18 to the primary bus such as bus 25. For example, processor unit 31 would, after detecting an error from the primary ESA 11 apply appropriate switch control to switch 21 to disconnect ESA 11 and connect the backup ESA 12 to the bus 25. The processor detects errors above threshold, for example, by comparing the responses to a standard or reference response at a comparator. These errors are accumulated in a counter 31a in the processor unit 31. Processor 31 sends a switch signal to switch 21 via lead 47 to change the state to the second position to apply the signals in the backup unit 12 via terminal 21c to the bus 25 at terminal 21b. The processor unit 31 would then test the backup unit and if the backup unit errors are less than the threshold as described at the counter 31a, the backup unit continues to be operated and the system problem is considered to be in the primary unit. A flag signal is then generated at the processor unit 31 to indicate that the primary ESA 11 has been switched off and that the redundant unit 12 has been connected. Similarly, the primary IMU, when it fails its tests, looses control and the backup IMU is placed on bus 25 using switch 22. Similarly, when the primary SAD unit 15 errors or the primary RWA errors exceed their respective thresholds, they are switched off and the appropriate backup units are applied to the bus 25.

An earth sensor assembly (ESA) is checked or tested, for example, by supplying an interrupt signal from the ESA to the processor unit 31 at an 8 hertz rate. The software in the processor unit checks that there have been exactly four interrupts per 2 Hz cycle and that all the detectors (12 for example) have been read. If either does not occur (including the buffer data late timeouts), within five consecutive cycles, the earth sensor assembly ESA is commanded to its backup assembly. If a three detector quad, for example, has unreasonable input data, that quad is considered bad and the processor unit may provide the signal to switch 21 to switch to the backup ESA 12.

The inertial measurement unit (IMU) or gyro motion detector is tested by interrupting the processor unit 31 at a 10 Hz rate while the processor unit cycles at a 2 Hz rate. If there have not been exactly five interrupts per cycle for five consecutive cycles, the backup inertial measurement unit and its power supplies are commanded on. If the data transfer buffer times out (data late) for five consecutive cycles the backup IMU will be switched on. The attitude control software requires data from any set of three of the four gyros. If at least three are not indicated that they are on, the processor commands them all on and tests them. If they fail the test, the processor sends the control signal to switch to the backup inertial measurement unit. After each "gyro on" command, a 60 second delay is inserted to allow the gyros to get to operating speed.

The software at the processor unit 31 reads the solar array drive (SAD) electronics and issues a feed/correction command every half second. If the solar array drive (SAD) is in slew mode but the error does not decrease for two sets of 60 times each, the processor commands use of the backup unit.

The software in the processor unit normally controls the spacecraft attitude by torquing the three orthogonal reaction wheels. The wheels, are tested to see, if for a given torque value, the change in speed is within bounds. If a wheel should fail this test twice in a row, the skew wheel is turned on and the failed wheel turned off. If less than three wheels are found on, then the software turns all wheels on again.

If an anomalous symptom persists after the unit switch has been commanded, the processor unit 31 according to system 10, then makes the assumption that the fault is not in the subsystem unit but could be in the input/output bus. Therefore, a control bus command is generated at the processor 31 and is sent via leads 47 to the switches 21, 22, 23 and 24 and to switch 45 that places the control processor unit 31 and units 11 through 18 on redundant bus 27. In the case where the backup ESA 12 has been switched and the symptom or errors still exist, the switch 21 would be switched to its third state by a control signal to switch 21 from processor unit 31 via lead 47 to provide the signal from the backup unit 12 at terminal 21c to terminal 21d and onto bus 27. The signals on bus 27 would also be switched to the processor unit 31 by the second state of switch 45 which applies signals from terminal 45c to terminal 45b. The switch 45 would be commanded to the second state by a control signal from the processor unit 31. Similarly, a second detected error in any of the individual backup units 14, 16 or 18 would apply that backup unit to the second bus 27. All of the other units 11–18 still in use would also be switched to the secondary bus 27.

Should the fault still exist after the primary unit 11 has been switched and the redundant bus 27 has been connected, the software in the processor unit 31 concludes that it is the processor unit 31 that is in error and takes itself off the line by sending control signals to processor unit 33 over lead 49 and, in doing so, switches in the redundant processor unit 33. When it does this, the processor unit 31 also puts switch 45 in its third state applying the signals on bus 27 at terminal 45c to terminal 45d and thus to the processor unit 33.

When the redundant processor unit 33 takes control, it starts the entire checking and switching over from the start. The hardware units (1–18) that have been switched remain switched. The functional usage as directed by the software goes back to the original side. This latter feature is due to the fact that the two processors do not communicate to each other and the second processor cannot know the first processor has taken any redundancy switching actions. The switching sequence concludes when the anomaly is corrected and is left to the ground controller to command all good units switched during the sequence to the original side and to reset the software status flags which were set with any correction. If the anomaly is not corrected the software will continue to attempt operation in the processor unit last connected by ground command as primary. The uplink command as indicated at terminals 37 and 39 will apply command signal directly to the processor units.

Figure 2:
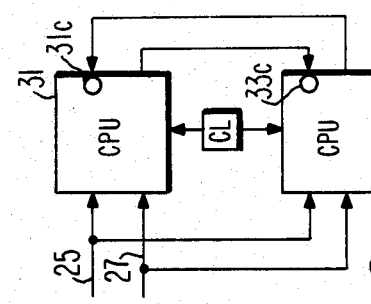
FIG. 2 is a sketch illustrating the autonomous redundant control system of FIG. 1 modified according to another second embodiment of the present invention.

Although the system as described assumes everything is going to be handled by one processor and on one bus, and the other bus and processor are only used for backup purposes, the system could preferably be operated as illustrated in FIG. 2 wherein the signals on buses 25 and 27 are both applied to the processor units 31 and 33 with controls over these functions being selected. For example, the ESA and IMU may be primarily controlled by the processor unit 31 and the SAD and RWA may be primarily controlled by the processor unit 33. In the event of any failure, say for example, processor unit 33 fails to handle the SAD information by the means discussed above, those signals would all exist in the processor units 31 and 33 simultaneously, but, the SAD control would only be switched from the processor unit 33 to 31 when there was a requirement for switching to the redundant processor unit.

Figure 3:
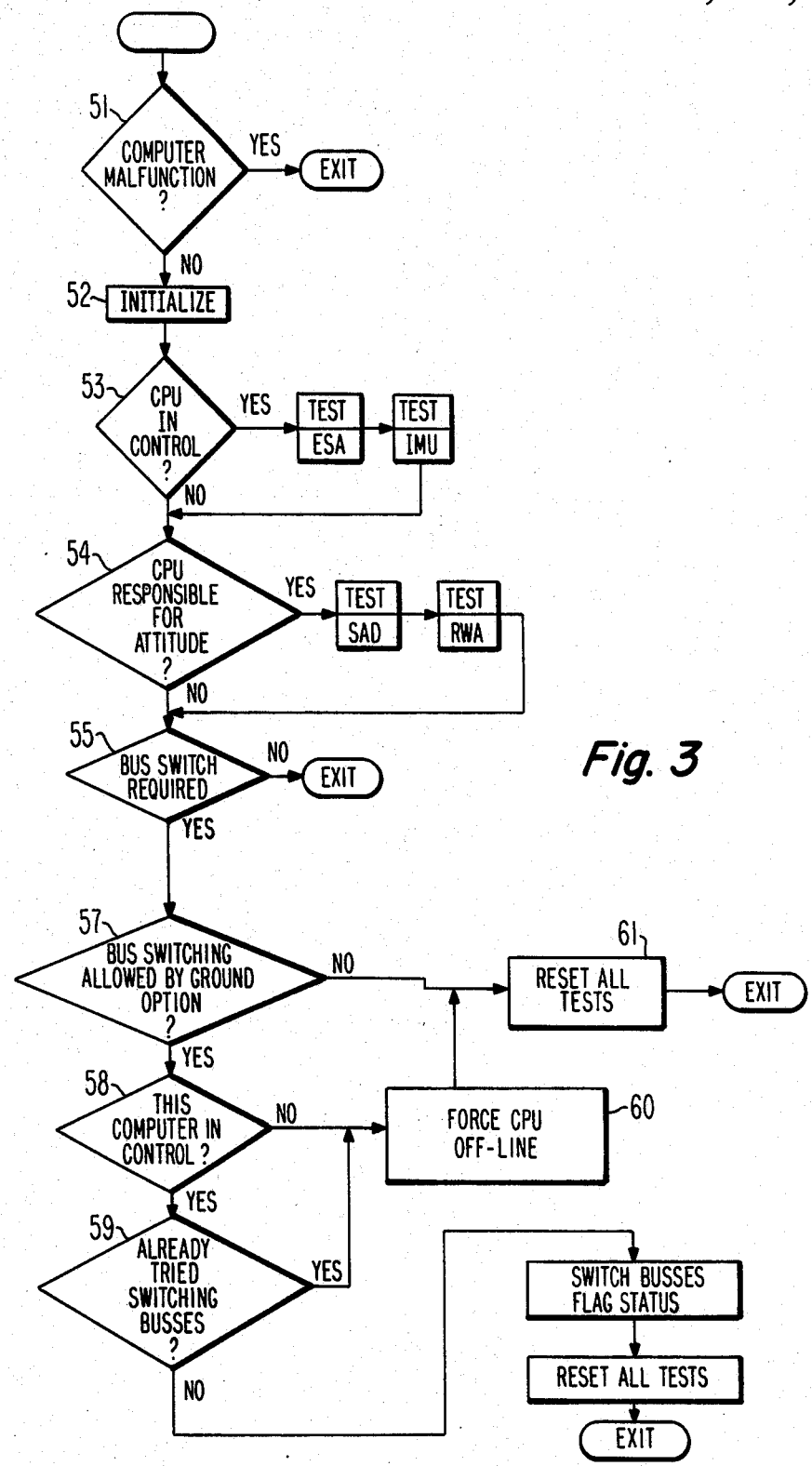
FIG. 3 shows an overall flow chart of a sample program used with the processor unit in the systems of FIGS. 1 and 2.
Figure 4:
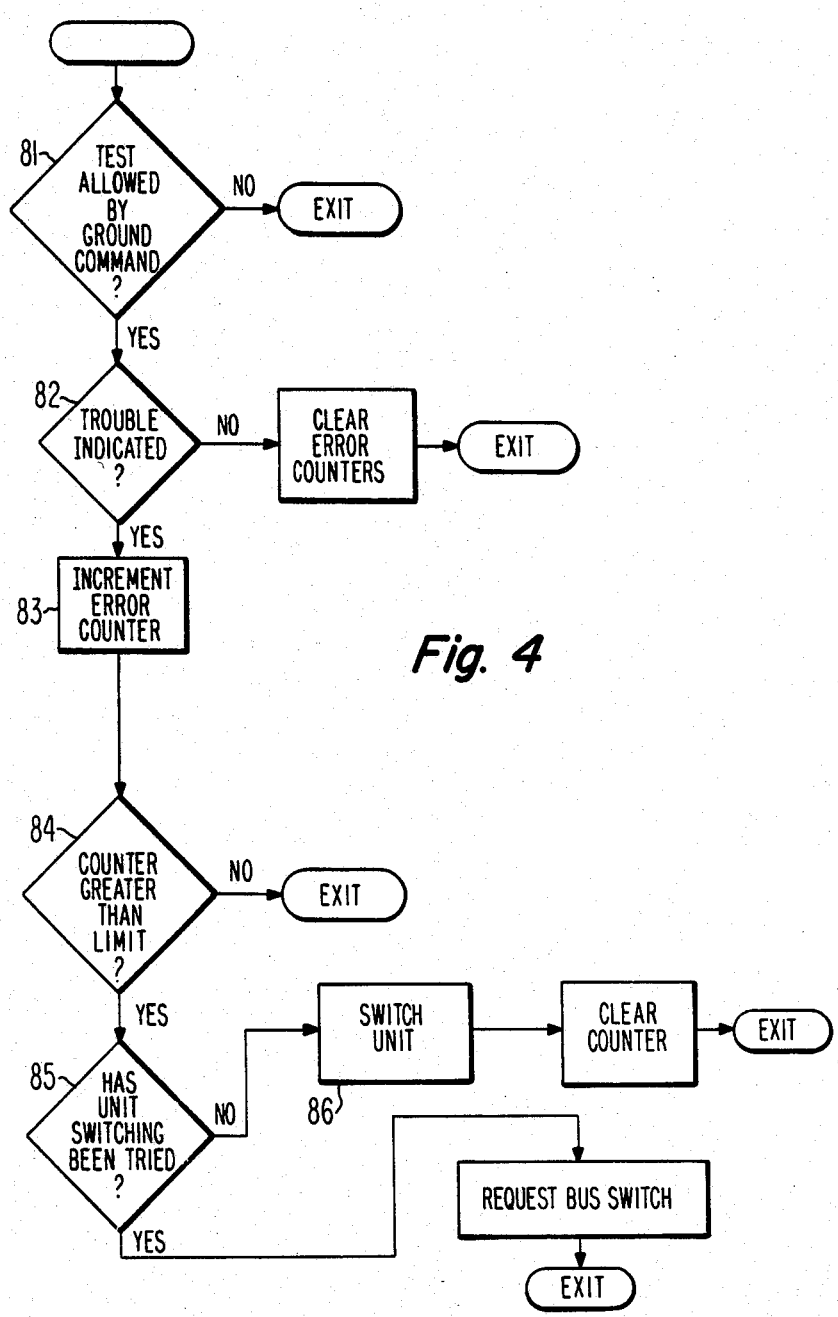
FIG. 4 is a flow chart of a sample program used for testing each of the individual units of the systems of FIG. 1 or 2.

FIGS. 3 and 4 are flow charts of the program for the system. Referring to FIG. 3, the program in the processor 31 or 32 initially performs a self-check as indicated by block 51. This self-check operation looks to see if the processor unit was functioning correctly according to preprogrammed tests. If there was a malfunction, the processor unit then provides an indication and it is switched out and replaced by the redundant processor. If there was no inherent preprogrammed malfunction indicated, the system would be initialized to clear all the counters and be ready to receive data and send the appropriate test signals as indicated at block 52.

The processor unit asks if it is in control of the test or if the other processor unit is then in control as indicated by blocks 53 and 54. Assuming that it is in control, it would then do the tests, as indicated by tests ESA and tests IMU. If these tests are completed, it then switches to the other processor if it is handling tests for the SAD and RWA units as in the system of FIG. 2.

After the tests, the processor unit checks to see if a bus switching is required. If there has been no flag or indication that there has already been a switching to the backup unit, then the system so indicates and the computer would be returned to its initial testing state. If, however, a backup unit was switched in the system and the errors still remain as indicated by a yes at block 55, the redundant bus would be switched if allowed.

Before switching actually takes place the processor unit would check (as indicated in block 57) to determine if the switching of the bus is allowed by the ground preprogrammed station. There might be a preprogramed instruction in the CPU from ground command that says that under no circumstances is redundant bus switching permitted. If switching to the redundant bus is not permitted, then all tests are reset again to look for redundant units that might be switched. If, however, the bus switching is allowed the computer then tests itself to make sure it's the computer that is in control. If that is true, as indicated at block 58, then it checks to see if it already tried switching buses as indicated at block 59. If it is indicated that it had already tried switching buses (answer at block 59 is yes), then the processor unit is forced off line and the other processor unit is set up and also at the same time all tests are reset again as indicated at blocks 60 and 61. If bus switching has not been tried, then a command is sent to switch the buses and provide a flag indicating that the bus had been switched and then a command is sent to reset all tests and begin testing again.

Referring to FIG. 4 there is indicated a program for the unit tests for either the ESA, for example, the IMU, RWA or SAD discussed above. The first test the program would look at would be, as indicated at box 81, whether or not this test is allowed by the ground station command stored in the processor unit. If allowed, the tests would be made and the computer would compare and determine whether or not there was any error indicated. If the errors do not exceed a certain threshold, then the processor would clear the counter and end the test. If, however, there was trouble indicated, the errors would be counted as indicated by block 83 and then, as indicated by block 84, a comparison would be made to indicate if that count exceeded a limit or threshold. If it did not, the unit would be assumed to have passed the test and the test would end without any switching. If, however, the counter indicated a greater threshold limit (as indicated by yes from the block 84), the computer would ask if, as indicated at block 85, the unit has been switched. If unit switching has not been tried, then a command, as indicated by block 86, would be sent from the processor to switch the redundant or backup unit and to clear the counter before resuming the test again. If, however, this switching has been indicated, then there would be sent a request to switch the bus.

We claim:

1. A method for providing on-board a spacecraft autonomous redundancy control to perform automatic fault detection and to automatically reconfigure a spacecraft system where that system includes primary sensors and primary controls, redundant sensors and redundant controls, data processor units for handling sensor and control data and input/output circuits between the sensors and the controls and the data processor comprising the steps of:
   automatically testing said primary sensors and primary controls at a primary processor unit,
   automatically disconnecting said primary sensor or primary control from said input/output circuit and connecting up said redundant sensor or redundant control upon detection at said primary processor unit of errors from said sensor or control exceeding a predetermined threshold,
   automatic testing of the switched redundant sensor or control at said primary processor unit, and
   automatically disconnecting a first input/output circuit and connecting a second redundant input/output circuit between said connected redundant sensor or control and said primary data processor unit if after connecting said redundant sensor or control the errors tested at the processor unit continue to exceed said threshold.

2. The method of claim 1 including automatically disconnecting said primary data processor and connecting into said system a redundant processor if after testing said redundant sensor or control connected to said redundant input/output circuit continues to have errors exceeding said predetermined threshold.

3. A spacecraft autonomous redundancy control system for providing fault detection and automatically reconfiguring a spacecraft system comprising:
   first input/output bus and second input/output bus;
   a plurality of spacecraft subsystems, each subsystem comprising a primary unit, a redundant unit, and a unit multiposition switch coupled between said primary unit and redundant unit and said first bus and said second bus such that the output from said primary unit is applied to said first bus in response to a first control signal, the output from said redundant unit is applied to said first bus in response to a second control signal and the output from said redundant unit is applied to said second bus in response to a third control signal; and
   a processor unit, said processor including means for testing for errors in the received signals from said subsystems for providing said first, second and third control signals in the following order:
   (1) initially providing said first control signal to all of said subsystem unit switches and testing for error signals received from said subsystems,
   (2) when the errors from any one of said subsystems exceeds a selected threshold, providing said second control signal to said unit switch to switch in the associated redundant unit and thereafter further testing for the errors from said redundant unit, and
   (3) if the errors from the redundant unit continue to exceed said selected threshold, providing said third control signal to said unit switch to thereby switch the redundant unit through said second bus to said processor.

4. A spacecraft autonomous redundancy control system for providing fault detection and automatically reconfiguring a spacecraft system comprising:
   first input/output bus and second input/output bus;
   a plurality of spacecraft subsystems, each subsystem comprising a primary unit, a redundant unit, and a unit multiposition switch coupled between said primary unit and redundant unit and said first bus and said second bus such that the output from said primary unit is applied to said first bus in response to a first control signal, the output from said redundant unit is applied to said first bus in response to a second control signal and the output from said redundant unit is applied to said second bus in response to a third control signal;
   a primary processor and a redundant processor;
   a system multiposition switch coupled between said primary processor and redundant processor and said first bus and said second bus for coupling said first bus to said primary processor unit in response to a fourth control signal, coupling said second bus to said primary processor in response to a fifth control signal and coupling said second bus to said redundant processor in response to a sixth control signal;
   said primary and redundant processors each including means for testing for errors in the received signals from said subsystems and means for providing said first, second, third, fourth, fifth and sixth control signals and a seventh control signal in the following order:
   (1) initially providing said first control signal to all of said subsystem unit switches, providing said fourth control signal to said system switch and testing for error signals received from said subsystems,
   (2) when the errors from any one of said subsystems exceeds a selected threshold, providing said second control signal to said subsystem unit switch to switch in the associated redundant unit to said first bus and thereafter further testing for errors from the redundant unit,
   (3) if the errors from the redundant unit continue to exceed said selected threshold, providing said third control signal to said unit subsystem switch and said fifth control signal to said system switch to thereby switch the redundant unit through said second bus to said primary processor,
   (4) testing the received signals via the second bus and if the errors continue to exceed said selected threshold, providing said sixth control signal to said system switch and said seventh control signal and then deactivating said primary processor; and
   said redundant processor being responsive to and activated upon receipt of said seventh control signal.

5. The combination of claim 4 wherein said spacecraft subsystems include an earth sensor assembly, an inertial measurement unit, a solar array driver and a reaction wheel assembly.

6. The combination of claim 4 wherein said subsystems send interrupt signals at a given rate and said processors include a counter for counting errors in receiving interrupt signals and when said errors exceed said selected threshold levels, providing said control signals.

7. The combination of claim 4 wherein said inertia measurement unit sends interrupt signals and said processors detect the number of received interrupts.

* * * * *